(12) United States Patent
Vialle

(10) Patent No.: US 7,578,330 B2
(45) Date of Patent: Aug. 25, 2009

(54) TIRE AND TIRE MANUFACTURING PROCESS

(75) Inventor: Jean-Yves Vialle, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 430 days.

(21) Appl. No.: 11/414,340

(22) Filed: May 1, 2006

(65) Prior Publication Data

US 2006/0243366 A1 Nov. 2, 2006

(30) Foreign Application Priority Data

May 2, 2005 (FR) .................................. 05 04466

(51) Int. Cl.
*B60C 9/08* (2006.01)
*B29D 30/30* (2006.01)
(52) U.S. Cl. .................... 152/560; 152/548; 156/134
(58) Field of Classification Search ................ 156/133, 156/134, 304.3; 152/548, 551, 555, 560
See application file for complete search history.

(56) References Cited

U.S. PATENT DOCUMENTS

| | | | | | |
|---|---|---|---|---|---|
| 1,043,143 | A | * | 11/1912 | Raymond | .................... 156/134 |
| 1,350,995 | A | * | 8/1920 | Grabau | ........................ 152/526 |
| 4,226,654 | A | | 10/1980 | Young | |
| 4,810,317 | A | * | 3/1989 | Lang | ........................... 156/134 |
| 5,435,370 | A | * | 7/1995 | Ahmad et al. | ................ 152/548 |
| 6,129,129 | A | | 10/2000 | Chandezon et al. | |

FOREIGN PATENT DOCUMENTS

| | | |
|---|---|---|
| EP | 0120623 | 3/1984 |
| EP | 120623 A2 * 10/1984 | .................. 156/34 |
| EP | 0407134 | 9/1991 |

* cited by examiner

*Primary Examiner*—Geoffrey L Knable
(74) *Attorney, Agent, or Firm*—Buchanan Ingersoll & Rooney PC

(57) ABSTRACT

The invention concerns a tire comprising beads each containing at least one circumferential reinforcement structure; a crown comprising a reinforcement structure surmounted radially towards the outside by a tread; on either side of the crown, a sidewall providing the connection to each bead; at least one carcass reinforcement extending from one bead to the other, passing through the crown, and anchored to at least one circumferential reinforcement structure within each bead, the carcass reinforcement being formed of at least one rubberized ply comprising reinforcing threads extending substantially radially, that is to say forming an angle of between 80° and 100° with the circumferential direction; at least one junction zone formed by superposition of the ply on itself, this zone being oriented substantially radially; at least one cover strip covering part of a junction zone, each cover strip being formed of a rubber composition reinforced by a plurality of reinforcing threads, the reinforcing threads of each cover strip having a substantially radial orientation, wherein, viewed in radial section, each cover strip extends between a point close to the axial end of the reinforcement structure of the crown and a point located radially to the inside of the axially outermost point of the tire.

7 Claims, 4 Drawing Sheets

TIRE AND TIRE MANUFACTURING PROCESS

FIELD OF THE INVENTION

The present invention relates to tires and to methods of manufacturing tires, and more particularly to the improvement of the appearance and the performance of a tire sidewall.

DEFINITIONS

"Reinforcing thread" or "reinforcement element" is understood to mean equally well cords and cables. A cord may be formed by a single monofilament or multifilament cord; a cable may or may not be provided with a central core. The material constituting the reinforcement elements may be variable; it may be metallic or of natural or synthetic textile.

"Radial" direction is understood to mean any direction included in a plane comprising the axis of rotation of the tire. A point is "radially to the inside" of another if it is located closer to the axis of rotation of the tire. A section is said to be "radial" when it is taken in a plane comprising the axis of rotation of the tire.

"Axial direction" is understood to mean a direction parallel to the axis of rotation of the tire.

"Circumferential direction" is understood to mean a direction perpendicular to the radial and axial directions.

TECHNOLOGICAL BACKGROUND

Despite the rapid developments in manufacturing processes (and in particular methods of building on a rigid core) in recent years, the majority of tires today are still built on drums. In this type of process, the carcass reinforcement, formed of one or more plies, is laid on a cylindrical drum such that its reinforcement elements are oriented in a direction substantially parallel to the axis of the drum. The carcass reinforcement having been wound around the drum, its ends are assembled such that the reinforcement forms a cylinder, the internal diameter of which corresponds to the diameter of the drum. The ends are assembled by means of a junction zone making it possible to connect the two edges of the reinforcement.

Two types of junction are commonly used: end-to-end junctions and overlapping junctions.

In the end-to-end junction of the edges of a ply, the connection of the ply edges depends on the adhesiveness of small portions of rubber composition coating the reinforcement elements. The junction zone is therefore not very strong and may deteriorate during the transformation of the cylindrical blank of the reinforcement into a toroidal blank during the later shaping of the tire, in particular in the zones of greater circumferential development.

It has been proposed for a long time to reinforce the end-to-end junction zone by applying a small layer of rubber, located close to the zone. Thus, document U.S. Pat. No. 1,899,067 proposes laying a sheet of adhesive rubber on the edges of the carcass reinforcement and applying heat and pressure to 'weld' the zone. Document EP 0 120 623 discloses a more recent variant of the same approach. FR 2 389 483 proposes replacing the rubber with a reinforced cover strip, the reinforcing threads of which are oriented virtually along a circumference of the cylinder formed by the carcass reinforcement. Document DE 2 504 181 pursues this reasoning by proposing using a pre-stretched strip, which makes it possible to supply more resistance to the zone during the transformation of the cylindrical blank of the reinforcement into a toroidal blank, and to avoid the formation of zones of great thickness (imbalance).

As its name indicates, the overlapping junction consists of covering, over a certain distance, an edge of a ply of the carcass reinforcement with the other edge and connecting them by application of pressure. This type of junction is more particularly used when the fabric is reinforced by textile cords or cables. It is particularly robust, due to the large surface of adhesion between the overlapping parts.

Having a double thickness of fabric over a certain circumferential distance, this junction is however not without its drawbacks. The number of reinforcement elements is doubled over the junction zone; under the action of the inflation pressure, the elongation of the reinforcement elements of the zone is therefore twice as little compared with the elongation of all the other reinforcement elements of the reinforcement. The result is a loss of uniformity of the sidewalls of the tire, which may have an influence on the performance of the tire or at the very least on its appearance.

Various solutions have been proposed: EP 0 407 134 discloses the use of a rubber cover strip to cover all or part of the junction zone. U.S. Pat. No. 4,810,317 teaches using a reinforced strip covering the entire junction zone, the reinforcement elements of the strip being arranged preferably at an angle of 10 to 25 degrees relative to the reinforcement elements of the carcass reinforcement.

These solutions do not always permit satisfactory reduction of the irregularity of the sidewall. They also have the drawback of requiring the addition of a relatively large quantity of rubber or of rubberized fabric and of increasing the imbalance of the tire. The addition of a reinforced strip covering the entire junction zone may even have an effect contrary to the desired aim, because this strip can act as a reinforcement of the carcass ply in the junction zone, thus making worse the deformation of the sidewall when the tire is inflated.

Other solutions have been proposed. It has in particular been suggested to cut the reinforcement elements in that part of the ply where there is superposition. This solution effectively makes it possible to reduce the zone of greatest resistance to elongation, but it is a delicate operation and involves the risk that too many elements will be cut and that fragile zones will thus be formed.

It has also been proposed to provide a carcass reinforcement comprising reinforcing elements of lesser resistance to elongation in the junction zone. This solution constitutes a solution to the problem of the deformation of the sidewall, but it is expensive and difficult to implement on an industrial scale.

The first object of the present invention is to solve the problem of the irregularity of the sidewall by simple means, industrial use of which is not costly.

SUMMARY OF THE INVENTION

This object is achieved by a tire comprising
beads each containing at least one circumferential reinforcement structure;
a crown comprising a reinforcement structure surmounted radially towards the outside by a tread;
on either side of the crown, a sidewall providing the connection to each bead;
at least one carcass reinforcement extending from one bead to the other, passing through the crown, and anchored to at least one circumferential reinforcement structure within each bead, the carcass reinforcement being formed of at least one rubberized ply comprising reinforcing threads extending substantially radially, that is to say forming an angle of between 80° and 100° with the circumferential direction;

at least one junction zone formed by superposition of the ply on itself, this zone being oriented substantially radially;

at least one cover strip covering part of a junction zone, each cover strip being formed of a rubber composition reinforced by a plurality of reinforcing threads;

the reinforcing threads of each cover strip having a substantially radial orientation;

wherein, viewed in radial section, each cover strip extends between
- a point close to the axial end of the reinforcement structure of the crown and
- a point located radially to the inside of the axially outermost point of the tire.

If the length L designates the distance, in a radial plane, between (i) the radially innermost point of the section of the circumferential reinforcement structure in a bead and (ii) the axial end of the reinforcement structure of the crown, this distance being measured along the surface of the carcass reinforcement, the cover strip preferably extends from a point located at a distance D of the circumferential reinforcement structure to the axial end of the reinforcement structure of the crown. The distance D lies between 0.3·L and 0.7·L, and preferably at 0.4·L. The exact value may be selected as a function of the visible deformations on overinflated tires (typically to 3 bar). Preferably, a length of the cover strip is selected such that it is not in contact with the reinforcement structure of the crown, but stops at a distance less than 0.1·L from the axial end of the reinforcement structure of the crown. Thus it is possible to avoid any contact between the cover strip and the reinforcement structure of the crown, even taking into account the manufacturing tolerances.

It was noted that the reduction in the deformation of the sidewall depends on the width of the cover strip, relative to the width of the junction zone. Preferably, the width of each cover strip, measured in the circumferential direction, is greater than the width of the junction zone in the bead (where the junction zone is not modified during shaping of the tire). The reduction in the deformation of the sidewall is particularly satisfactory when the width of each cover strip, measured in the circumferential direction, is greater than the greatest width of the junction zone in its part covered by said cover strip. Of course, the width of each cover strip must not exceed a certain limit, otherwise it may in its turn cause deformation of the sidewall. Preferably, the width of each strip measured in the circumferential direction is less than four times, and even more preferably less than two times, the greatest width of the junction zone in its part covered by the cover strip.

Preferably, each cover strip is centered, in the circumferential direction, around the junction zone.

The thickness of each cover strip, measured on a molded tire, in a direction perpendicular to the surface of the carcass reinforcement, is of between 0.6 and 1.5 mm.

A cover strip may have the same constitution as a ply of the carcass reinforcement, or a different constitution. By way of example, a reinforcement strip comprising nylon reinforcing threads on a carcass reinforcement formed of polyester reinforcing threads has been used successfully.

The invention also relates to a process for manufacturing a tire on a drum, the tire comprising:

beads each containing at least one circumferential reinforcement structure;

a crown comprising a reinforcement structure surmounted radially towards the outside by a tread;

at least one carcass reinforcement extending from one bead to the other, passing through the crown, and anchored to at least one circumferential reinforcement structure within each bead, the carcass reinforcement being formed of at least one rubberized ply comprising reinforcing threads extending substantially radially;

at least one junction zone formed by superposition of the ply on itself, this zone being oriented substantially radially; and at least one cover strip covering part of a junction zone, each cover strip being formed of a rubber composition reinforced by a plurality of reinforcing threads;

the process comprising the stages consisting of:
Winding the ply around the drum so as to obtain covering of the edges of the ply which are parallel to the axis of the drum;

Forming, on the covering end of the ply, one or more tabs each intended to form a cover strip and located such that, after building of the tire, each cover strip covers part of a junction zone and extends, viewed in a radial section, between a point close to the axial end of the reinforcement structure of the crown and a point located radially to the inside of the axially outermost point of the tire;

Folding the tabs over by folding them along the line defined by the edge of the ply from which they project.

In the process according to the invention, the tabs may be formed before or after the ply is wound around the drum.

As is well-known to the person skilled in the art, the plies used to constitute carcass reinforcements are frequently themselves formed by an assembly of several parts and have what are called "preparatory" junction zones, to be distinguished from the "building" junction zones formed on the drum, during the building of the tire. The "preparatory" junction zones therefore exist even before the carcass reinforcement is formed on the drum. They may also cause deformations of the sidewall, even if, generally, they are better controlled than the "building" junction zones; the cover strips according to the invention may also be applied to the "preparatory" junction zones.

The invention will be better understood thanks to the description of the drawings, in which.

DESCRIPTION OF EMBODIMENTS

Figure 1:
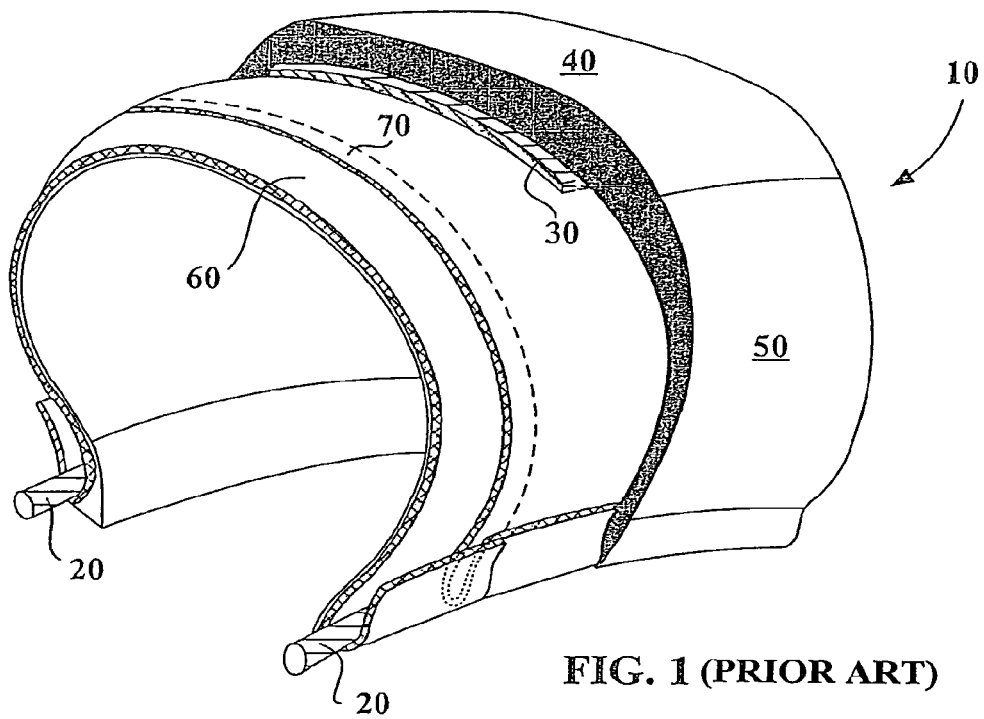
FIG. 1 represents diagrammatically the view in section of a tire in accordance with the prior art.

FIG. 1 shows a tire 10 in accordance with the prior art comprising beads each containing a circumferential reinforcement structure 20 and a crown comprising a reinforcement structure 30 surmounted radially towards the outside by a tread 40. On either side of the crown, a sidewall 50 provides the connection to each bead. A carcass reinforcement 60 extends from one bead to the other, passing through the crown; it is anchored to the two circumferential reinforcement structures 20 within each bead. The carcass reinforcement 60 is formed of at least one rubberized ply comprising reinforcing threads extending substantially radially, that is to say forming an angle of between 80° and 100° with the circumferential direction. A junction zone 70 is formed by superposition of the ply on itself, this zone 70 being oriented substantially radially.

Figure 2:
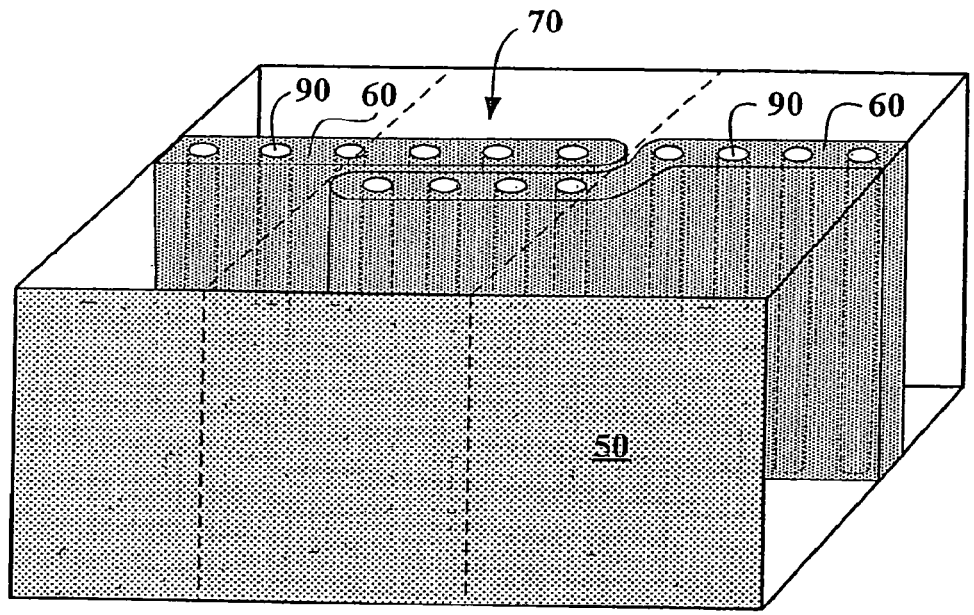
FIG. 2 represents diagrammatically part of the sidewall of a tire in accordance with the prior art, before inflation.
Figure 3:
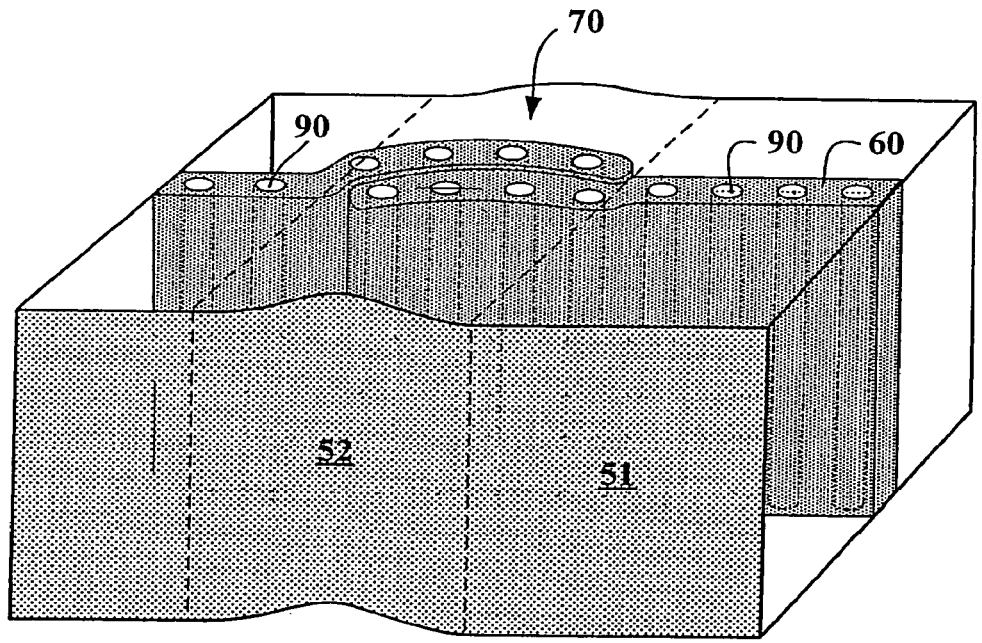
FIG. 3 represents diagrammatically part of the sidewall of a tire in accordance with the prior art, after inflation.

FIGS. 2 and 3 illustrate the mechanism resulting in the deformation of the sidewall during the inflation of a tire 10 in accordance with the prior art.

FIG. 2 represents diagrammatically part of the sidewall of a tire 10 in accordance with the prior art, before inflation. The carcass reinforcement 60 comprising reinforcing threads 90 is shown. Part of the junction zone 70 is visible. When the tire is not inflated, the sidewall 50 has a regular appearance.

FIG. 3 shows diagrammatically the same part of the sidewall of a tire 10 in accordance with the prior art, after inflation. Under the stress of the inflation pressure, the tire 10 has become deformed. Given that the sidewall comprises twice as many reinforcing threads 90 per surface in the junction zone 70 as elsewhere, the carcass reinforcement 60 in the junction zone 70 offers more resistance to the deformation of the tire due to inflation. The relative movement of the different parts of the carcass reinforcement 60 results in the formation of a zone of deformation 52 of the sidewall which appears as a hollow relative to the surface of the sidewall 51 in the zones remote from the junction zone 70. The invention is aimed at reducing this phenomenon. It should be pointed out that the reinforcing threads 90 of the carcass reinforcement 60 have been represented diagrammatically, for purely illustrative reasons. The relative position of the reinforcing threads 90 within the carcass reinforcement 60 before and after inflation may differ from the configuration shown.

Figure 4:
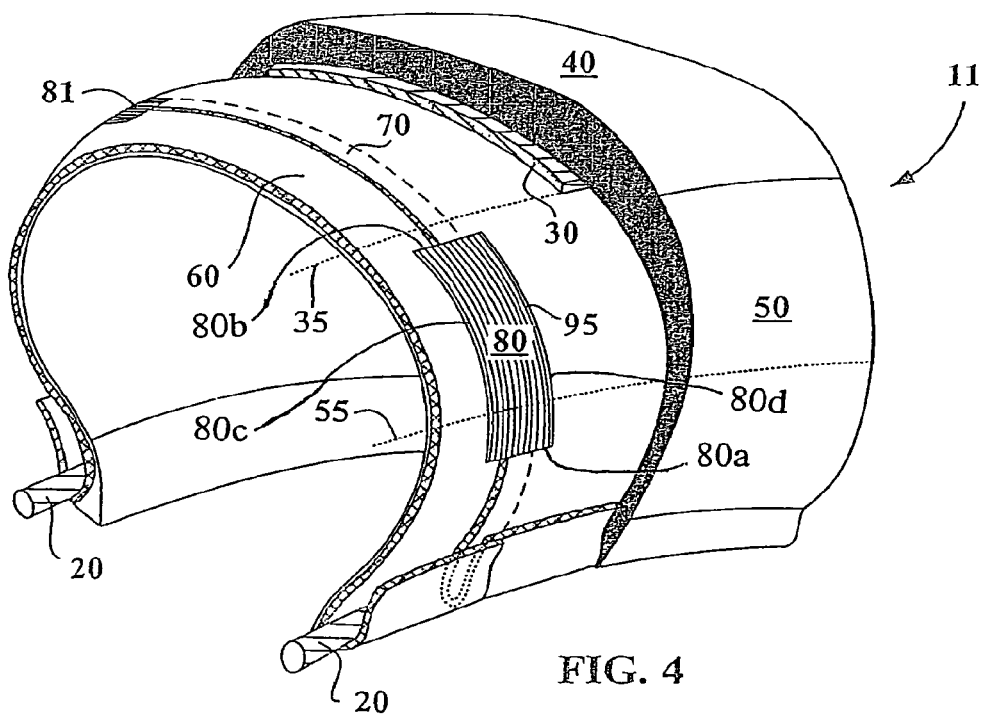
FIG. 4 represents diagrammatically the view in section of a tire according to the invention.

FIG. 4 represents diagrammatically a view in section of a tire 11 according to the invention. This tire 11 differs from the tire 10 in accordance with the prior art in that cover strips 80 and 81 comprising reinforcing threads 95 have been added. Each cover strip includes first and second ends 80a and 80b, and also includes first and second edges 80c and 80d that are spaced circumferentially apart on opposite sides of the junction zone 70. It can be seen that the cover strip 80 covers the junction zone 70 between (i) a point close to the axial end (suggested by the dotted line 35) of the reinforcement structure 30 of the crown, and (ii) a point located radially to the inside of the axially outermost point of the tire (which is located on the dotted line 55). The reinforcing threads of each cover strip (not shown) have a substantially radial orientation.

As can clearly be seen from FIG. 4, in a tire according to the invention, the cover strip 80 extends from a point close to the axial end of the reinforcement structure 30 of the crown which is "on the same side" as the cover strip 80; the cover strip 80 therefore never covers the entire junction zone beneath the reinforcement structure 30.

In the example shown, the cover strip 80 ends without reaching the axial end (suggested by the dotted line 35) of the reinforcement structure 30 of the crown, but according to other variants of the invention, it may be in contact with the reinforcement structure 30 or extend slightly beneath the reinforcement structure. The most satisfactory results have been obtained with cover strips 80 which do not extend beneath the reinforcement structure 30 of the crown. Typically, for a passenger-car tire, the distance between the cover strip 80 and the reinforcement structure 30 is less than 10 mm.

If the length L designates the distance, in a radial plane, between the circumferential reinforcement structure 20 and the axial end of the reinforcement structure of the crown 30, this distance being measured along the surface of the carcass reinforcement 60, the cover strip 80 extends from a point located at a distance of 0.35·L from the circumferential reinforcement structure 20 to a distance of 0.05·L from the end of the reinforcement structure of the crown 30.

Figure 5:
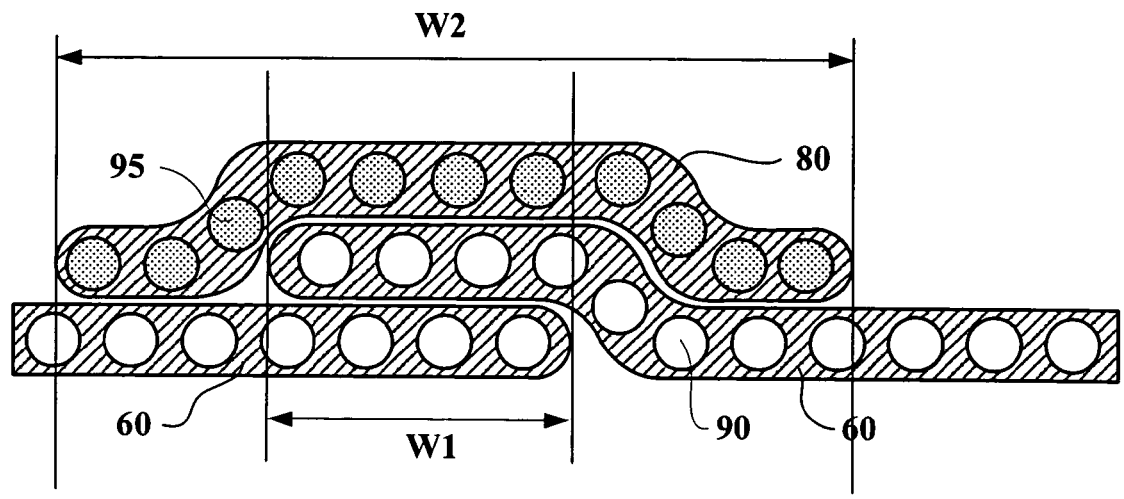
FIG. 5 represents diagrammatically in section the junction zone of the ply of the carcass reinforcement and the cover strip which covers it.

FIG. 5 represents diagrammatically in section the junction zone of the carcass reinforcement (60) (comprising reinforcing threads 90) and the cover strip 80 (comprising reinforcing threads 95) which covers it. The width W2 of the covering zone is greater than the width W1 of the junction zone. In this case, W1 is approximately equal to 2.6·W1. The representation corresponds to the preferred embodiment in which the cover strip 80 is centered on the covering zone, but it is also possible to provide an off-centre cover strip.

A series of comparative tests was carried out to show the deformation of the sidewall on a tire according to the invention "I" and on different controls ("A", "B", "C"). The following table summarizes the results for three solutions tested; a dimension with a large visible sidewall height was selected to provide adverse conditions in terms of deformation of the sidewall:

| Variant | Tires of dimension 145/80 R13 |
|---|---|
| "A" | No cover strip |
| "B" | Cover strip over the entire length of the junction zone (length: 220 mm) |
| "I" | Cover strip according to the invention (length: 50 mm) |

The results (averages obtained on several tires without "preparatory" junction zones) are summarized in the following table:

| Variant | Hump deformation [μ] | Hollow deformation [μ] | Hollow-hump deformation [μ] |
|---|---|---|---|
| "A" | 145 | 337 | 457 |
| "B" | 135 | 402 | 506 |
| "I" | 135 | 166 | 283 |

These results reflect the very clear reduction in the hollow deformation of the sidewall obtained with the tire according to the invention.

Figure 6:
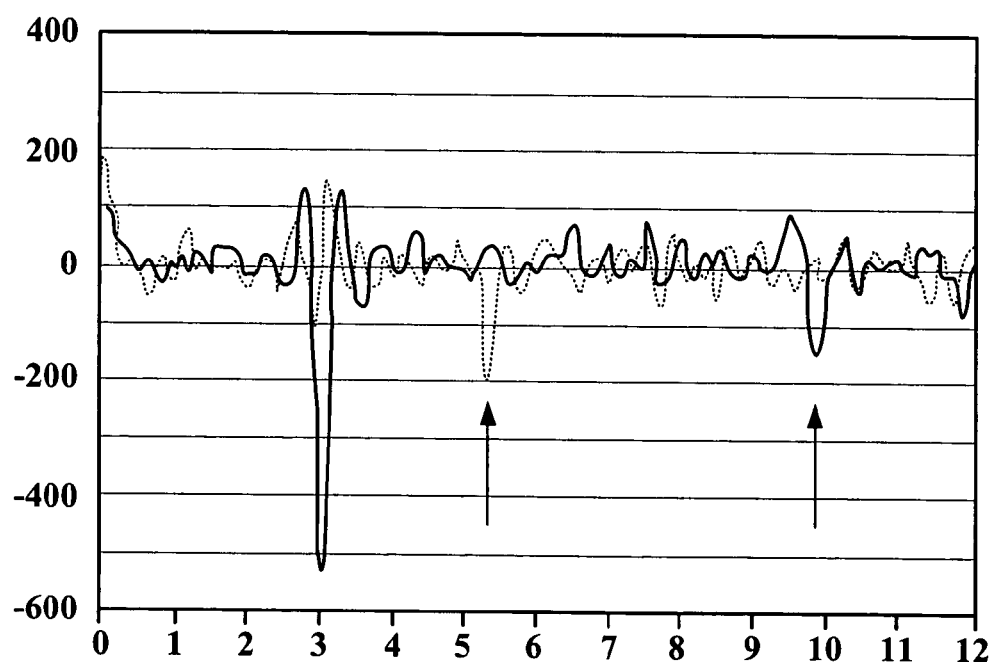
FIG. 6 shows the values of the deformation of the sidewall as a function of the angular position on the sidewall.

FIG. 6 shows the values of the deformation of the sidewall as a function of the angular position on the sidewall for the variants "A" (unbroken line) and "I" (dotted line). Unlike the values given further above, these curves were obtained on tires having "preparatory" junction zones; their locations are indicated by arrows.

Figure 7:
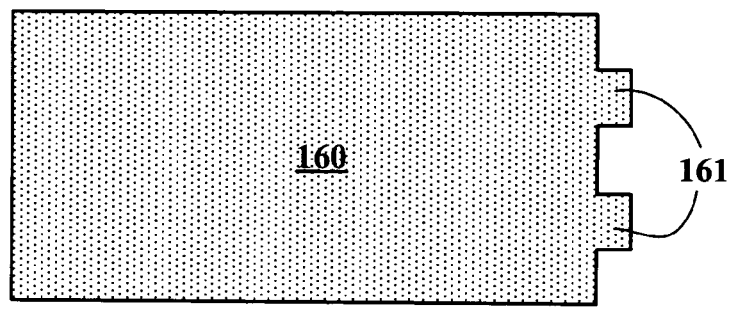
FIGS. 7 and 8 illustrate an embodiment of the process according to the invention.
Figure 8:
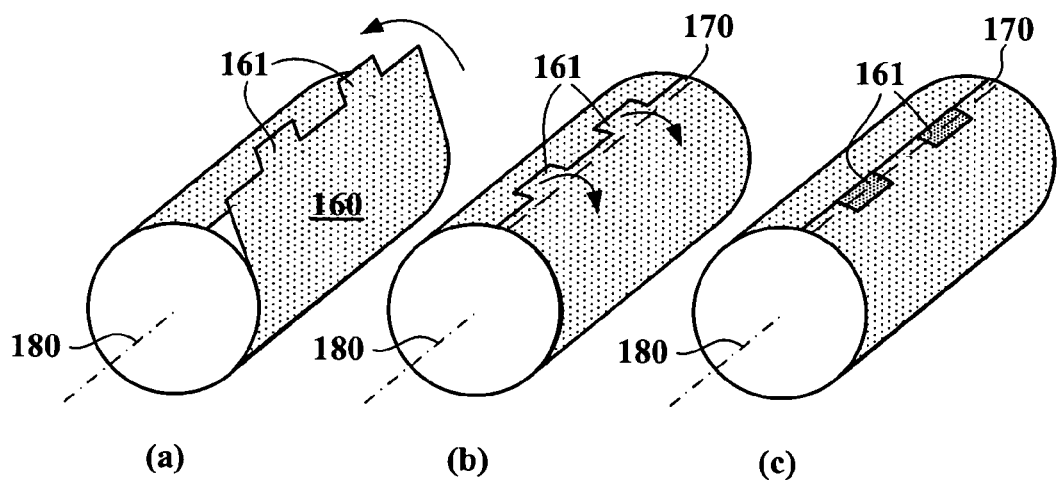

FIGS. 7 and 8 illustrate an embodiment of the process according to the invention.

FIG. 7 represents diagrammatically a ply 160 having two tabs 161. Of course, the size of the tabs has been exaggerated so as to better illustrate the principle of the process according to the invention.

FIG. 8 shows two stages of the process according to the invention.

In a first phase (FIG. 8(a)), the ply 160 intended to form the carcass reinforcement is wound around a drum (not shown) so as to obtain overlapping 170 of the edges of the ply which are parallel to the axis 180 of the drum.

Then (FIG. 8(b)) the tabs 161 are folded over by folding them along the line defined by the edge of the ply 160 from which they project.

Thus there is obtained a carcass ply with a junction zone provided with cover strips, as shown in FIG. 8(c).

Figure 9:
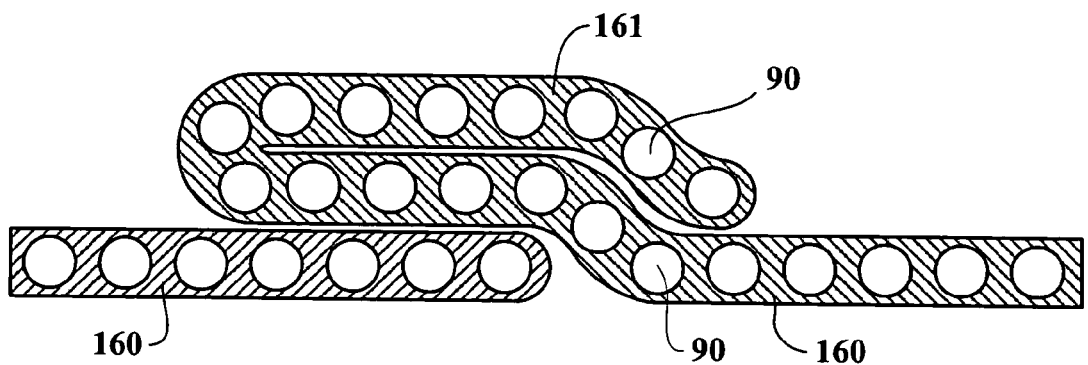
FIG. 9 represents diagrammatically in section the junction zone obtained with the process shown in FIG. 8.

FIG. 9 represents diagrammatically in section the junction zone obtained, and the folded-over tab 161 forming a cover strip.

There is no obligation to use a pre-cut ply such as that of FIG. 7. The person skilled in the art will understand that the cutting-out can be performed when the ply has been wound around the building drum.

I claim:

1. A tire comprising
   beads each containing at least one circumferential reinforcement structure;
   a crown comprising a reinforcement structure surmounted radially towards the outside by a tread;
   on either side of the crown, a sidewall providing the connection to each bead;
   at least one carcass reinforcement extending from one bead to the other, passing through the crown, and anchored to at least one circumferential reinforcement structure within each bead, the carcass reinforcement being formed of at least one rubberized ply comprising reinforcing threads extending substantially radially, that is to say forming an angle of between 80° and 100° with the circumferential direction;
   at least one junction zone formed by superposition of the ply on itself, this zone being oriented substantially radially;
   at least one cover strip covering part of a junction zone, each cover strip being formed of a rubber composition reinforced by a plurality of reinforcing threads,
   the reinforcing threads of each cover strip having a substantially radial orientation, wherein each cover strip includes first and second edges spaced apart on opposite circumferential sides of the junction zone and the width of each cover strip, measured in the circumferential direction, is less than four times the greatest width of the junction zone in its part covered by said cover strip;
     wherein, viewed in radial section, each cover strip includes first and second ends, the first end disposed at a point located radially to the inside of the axially outermost part of one sidewall of the tire and a second end located at a point close to the axial end of the crown's reinforcement structure located nearest to that sidewall.

2. The tire of claim 1, wherein the width of each cover strip, measured in the circumferential direction, is greater than the greatest width of the junction zone in its part covered by said cover strip.

3. The tire of claim 1, wherein the thickness of each cover strip on the molded tire is between 0.6 and 1.5 mm.

4. The tire of claim 1, wherein at least one cover strip has the same constitution as at least one ply of the carcass reinforcement.

5. A process for manufacturing a tire on a drum, the tire comprising:
   beads each containing at least one circumferential reinforcement structure;
   a crown comprising a reinforcement structure surmounted radially towards the outside by a tread;
   at least one carcass reinforcement extending from one bead to the other, passing through the crown, and anchored to at least one circumferential reinforcement structure within each bead, the carcass reinforcement being formed of at least one rubberized ply comprising reinforcing threads extending substantially radially;
   at least one junction zone formed by superposition of the ply on itself, this zone being oriented substantially radially; and
   at least one cover strip covering part of a junction zone, each cover strip being formed of a rubber composition reinforced by a plurality of reinforcing threads; the process comprising the stages consisting of:
   Winding the ply around the drum so as to obtain covering of the edges of the ply which are parallel to the axis of the drum;
   Forming, on the covering end of the ply, one or more tabs each intended to form a cover strip and located such that, after building of the tire, each cover strip covers part of a junction zone and extends, viewed in radial section, between a point close to the axial end of the reinforcement structure of the crown and a point located radially to the inside of the axially outermost point of the tire;
   Folding the tabs over by folding them along the line defined by the edge of the ply from which they project.

6. The process of claim 5, wherein the tabs are formed before the ply is wound around the drum.

7. A tire comprising
   beads each containing at least one circumferential reinforcement structure;
   a crown comprising a reinforcement structure surmounted radially towards the outside by a tread;
   on either side of the crown, a sidewall providing the connection to each bead;
   at least one carcass reinforcement extending from one bead to the other, passing through the crown, and anchored to at least one circumferential reinforcement structure within each bead, the carcass reinforcement being formed of at least one rubberized ply comprising reinforcing threads extending substantially radially, that is to say forming an angle of between 80° and 100° with the circumferential direction;
   at least one junction zone formed by superposition of the ply on itself, this zone being oriented substantially radially, wherein the ply includes a covering end forming a radially outer layer of the junction zone;
   at least one cover strip covering part of a junction zone, each cover strip being formed of a rubber composition reinforced by a plurality of reinforcing threads, the reinforcing threads of each cover strip having a substantially radial orientation;
     wherein the covering end of the ply includes an edge from which one or more tabs project which are folded about the edge and back onto the covering end, to form said at least one cover strip.

* * * * *